United States Patent [19]
Ohmori et al.

[11] Patent Number: 5,699,344
[45] Date of Patent: Dec. 16, 1997

[54] DISK DRIVE DEVICE HAVING STABILIZED SPINDLE

[75] Inventors: Kiyoshi Ohmori; Hideyoshi Horimai, both of Kanagawa, Japan

[73] Assignee: Sony Corporation, Tokyo, Japan

[21] Appl. No.: 979,665

[22] Filed: Nov. 20, 1992

[30] Foreign Application Priority Data

Nov. 27, 1991 [JP] Japan ............................ P03-337574

[51] Int. Cl.⁶ ............................................. B11B 25/04
[52] U.S. Cl. ............................................................ 369/264
[58] Field of Search ................................. 369/258, 263, 369/264, 266, 77.2, 270; 360/97.02, 99.12

[56] References Cited

U.S. PATENT DOCUMENTS

| | | | |
|---|---|---|---|
| 4,481,619 | 11/1984 | Oozeki | 369/264 |
| 4,482,993 | 11/1984 | Agoshini | 369/266 |
| 4,680,748 | 7/1987 | Kobayashi | 369/264 |
| 4,941,140 | 7/1990 | Ono et al. | 369/264 |

FOREIGN PATENT DOCUMENTS

| | | | |
|---|---|---|---|
| 0450528 | 10/1991 | European Pat. Off. | 369/264 |
| 0066772 | 3/1990 | Japan | 369/264 |

*Primary Examiner*—Stuart S. Levy
*Assistant Examiner*—Brian E. Miller
*Attorney, Agent, or Firm*—Limbach & Liimbach L.L.P.

[57] ABSTRACT

Disclosed herein is a disk drive device comprising a chassis; a spindle motor vertically movably mounted on the chassis, for rotatively driving a disk-shaped recording medium; a cam adapted to contact a pin projecting from the spindle motor, for vertically driving the spindle motor through the pin; a loading motor mounted on the chassis, for rotatively driving the cam; a block fixed to the chassis, for restricting an upper limit of a vertical stroke of the spindle motor: and a spring for biasing the spindle motor against the block. Accordingly, the spindle motor can be stably positioned in a loaded condition of the disk-shaped recording medium, and the construction can be simplified with no need of high accuracy of the cam.

2 Claims, 4 Drawing Sheets

DISK DRIVE DEVICE HAVING STABILIZED SPINDLE

BACKGROUND OF THE INVENTION

The present invention relates to a disk drive device for rotatively driving a disk-shaped recording medium (which will be hereinafter referred to as a disk), which is adapted to be provided in a recording/reproducing apparatus such as an optical disk player for recording and/or reproducing information to and/or from the disk.

In a known optical disk player having an optical head for recording and/or reproducing information to and/or from a disk rotatably accommodated in a cartridge, a spindle motor for rotatively driving the disk is fixed, and the cartridge is vertically moved to attach or detach the disk to or from the spindle motor.

However, in a known disk drive device provided in the optical disk player mentioned above, the cartridge having a relatively large area is loaded to or unloaded from the device by means of a loading mechanism having a complex structure, so that the device is large in size and complex in mechanism. Further, since positioning of the cartridge is effected by reference pins provided on a chassis of the device, the cartridge cannot be securely retained on the chassis, causing a possibility of resonance of the disk.

To solve this problem, there has been proposed an improved disk drive device such that a cartridge holder for detachably supporting the cartridge is fixed to the chassis, and the spindle motor is vertically moved to be attached to or detached from the disk in the cartridge supported in the cartridge holder.

An example of such a disk drive device is shown in FIGS. 3, 4 and 5. There are shown in FIG. 5 a cartridge 1 and a cartridge holder 2, but they are not shown in FIGS. 3 and 4 for the purpose of clearly illustrating an internal construction of the device. Reference numeral 3 denotes a substantially rectangular plate-like chassis of the device, and reference numeral 4 denotes a disk rotatably accommodated in the cartridge 1. A spindle motor 5 for rotatively driving the disk 4 is vertically movably provided on the chassis 3. The spindle motor 5 is fixedly retained in a casing 6 in concentrical relationship thereto. A plurality of (e.g., two) guide shafts 7 are so provided as to stand upright on the chassis 3. The casing 6 is formed with two guide holes 6a slidably receiving the two guide shafts 7, respectively. Accordingly, the spindle motor 5 retained in the casing 6 can be lifted and lowered in the axial direction thereof as being guided by the two guide shafts 7.

A loading motor 8 for vertically driving the spindle motor 5 is provided on the chassis 3 at one end thereof on the spindle motor 5 side. The loading motor 8 is constructed as a stepping motor, for example. An output shaft 9 of the loading motor 8 extends in the direction perpendicular to the axial direction of the guide shafts 7. A cam 10 for restricting the upper and lower positions of the spindle motor 5 is fixed to the output shaft 9. A pin 11 projects from the outer circumferential surface of the casing 6. The cam surface of the cam 10 is in contact with the pin 11, and the output shaft 9 is rotated to let the cam 10 lift or lower the pin 11, thereby positioning the spindle motor 5 at its upper or lower position. Further, a pair of projections 12 are provided on the outer circumferential surface of the casing 6, and a tensile coil spring 13 is connected between each projection 12 and the chassis 3 so as to normally bias the casing 6 in such a direction that the pin 11 contacts the cam surface of the cam 10.

A pair of guide rails 14 are provided on the chassis 3 so that a center line between the guide rails 14 extends in the diametrical direction of the disk 4. A carriage 15 adapted to be guided by the guide rails 14 and moved by an actuator (not shown) in the diametrical direction of the disk 4. A head 16 and an objective lens 17 opposed to the head 16 are provided at one end of the carriage 15 on the spindle motor 5 side. The disk 4 is inserted between the head 16 and the objective lens 17 with predetermined upper and lower spacings defined with respect thereto. Further, an optical member 18 for emitting light is provided on the chassis 3, and a reflecting mirror 19 for reflecting the light to the objective lens 17 is provided on the lower surface of the carriage 15 at a position laying on the optical axis of the head 16 and the objective lens 17. Thus, the guide rails 14, the carriage 15, the head 16, the objective lens 17 and the reflecting mirror 19 constitute an actuator section 20 of the device.

The cartridge holder 2 for receiving the cartridge 1 thereinto is fixed to the chassis 3 in parallel relationship thereto at a position over the spindle motor 5. When the cartridge 1 is inserted into the cartridge holder 2 at a predetermined position, the loading motor 8 starts to rotate. Then, the spindle motor 5 retained in the casing 6 is lifted by the operation of the cam 10 contacting the pin 11 owing to the biasing force of the tensile coil springs 13. When the rotation of the loading motor 8 is stopped, the spindle motor 5 is restricted at its upper position. At this time, a spindle of the spindle motor 5 is engaged with a center hole of the disk 4. Thereafter, the actuator section 20 is moved in the diametrical direction of the disk 4, and the head 16 is operated to read information on the disk 4 with the light emitted from the optical member 18.

However, in the conventional disk drive device mentioned above, the spindle motor 5 is normally biased by the tensile coil springs 13 to keep the contact of the pin 11 with the cam 10. The cam 10 is rotated by the loading motor 8 to position the spindle motor 5 at a predetermined level. At this time, the cam 10 and the pin 11 are in line contact with each other, so that the spindle motor 5 is considered to be in an unstable condition. Furthermore, the spindle motor 5 is supported to the two guide shafts 7 in an axially floating condition, and signal transfer between the disk 4 and the head 16 is carried out in such a floating condition. Therefore, the spindle motor 5 is apt to be oscillated in the unstable condition. In addition, the projections 12 and the tensile coil springs 13 are required for keeping the spindle motor 5 in contact with the cam 10 through the pin 11 are required, resulting in an increase in number of parts.

SUMMARY OF THE INVENTION

It is accordingly an object of the present invention to provide a disk drive device which can stably position the spindle motor in the loaded condition of the disk.

It is another object of the present invention to provide a disk drive device which is simple in construction and requires no high accuracy of the cam.

According to the present invention, there is provided a disk drive device comprising a chassis; rotatively driving means vertically movably mounted on said chassis, for rotatively driving a disk-shaped recording medium; vertically driving means adapted to contact a part of said rotatively driving means, for vertically driving said rotatively driving means; a loading motor mounted on said chassis, for rotatively driving said vertically driving means; positioning means fixed to said chassis, for restricting an upper limit of a vertical stroke of said rotatively driving means; and biasing means for biasing said rotatively driving means against said positioning means.

When unloading a cartridge accommodating the disk-shaped recording medium from the disk drive device, the vertically driving means is rotated by the loading motor to lower the rotatively driving means to a predetermined lower level. On the other hand, when loading the cartridge to the disk drive device, the vertically driving means is rotated by the loading motor, and the rotatively driving means is lifted by a biasing force of the biasing means until coming into contact with the positioning means. Thus, the rotatively driving means is positioned by the positioning means at a predetermined upper level. At this time, the vertically driving means is separate from the rotatively driving means.

Other objects and features of the invention will be more fully understood from the following detailed description and appended claims when taken with the accompanying drawings.

DETAILED DESCRIPTION OF THE PREFERRED EMBODIMENTS

Figure 1:
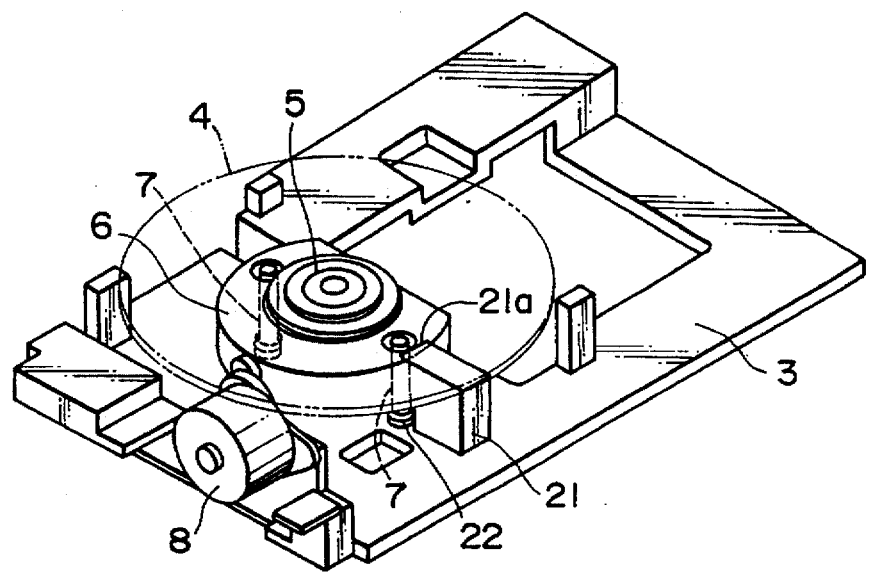
FIG. 1 is a perspective view of a disk drive device according to a preferred embodiment of the present invention.
Figure 2:
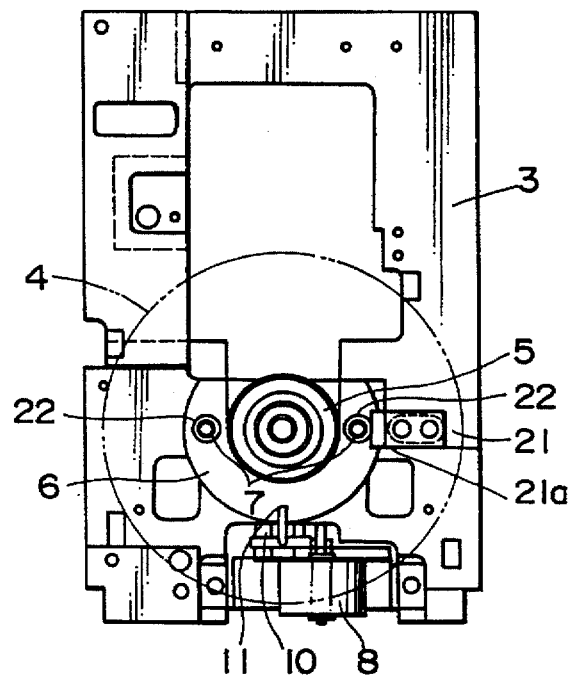
FIG. 2 is a plan view of FIG. 1.
Figure 3:
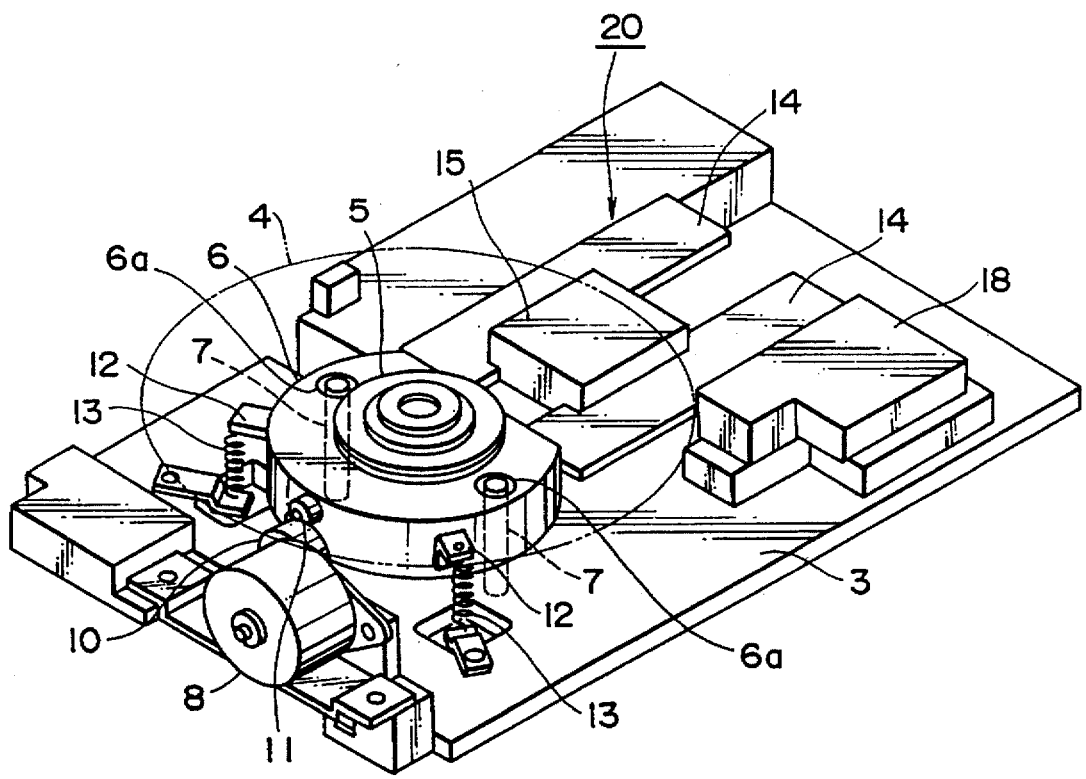
FIG. 3 is a perspective view of a disk drive device in the prior art.
Figure 4:
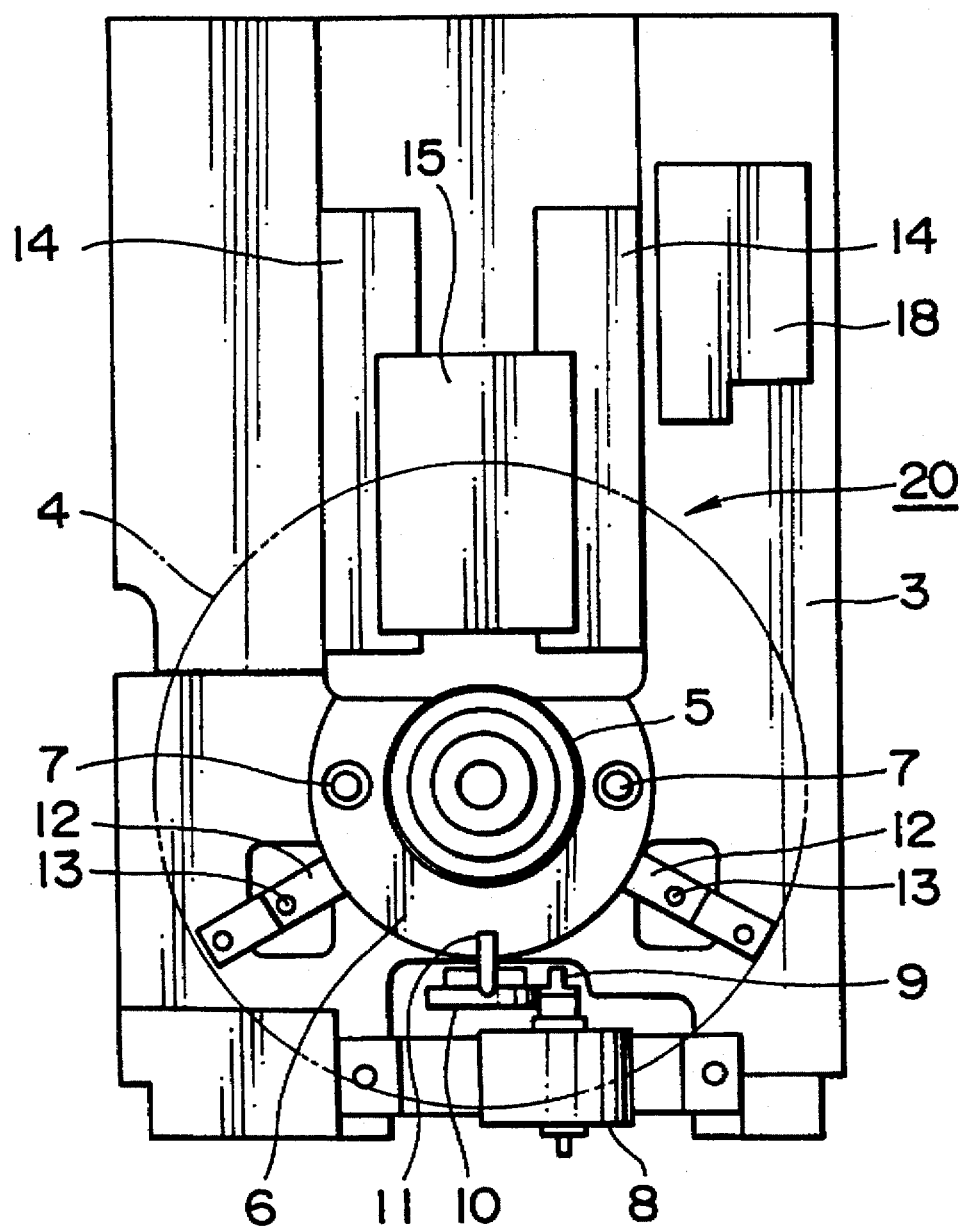
FIG. 4 is a plan view of the disk drive device of FIG. 3.
Figure 5:
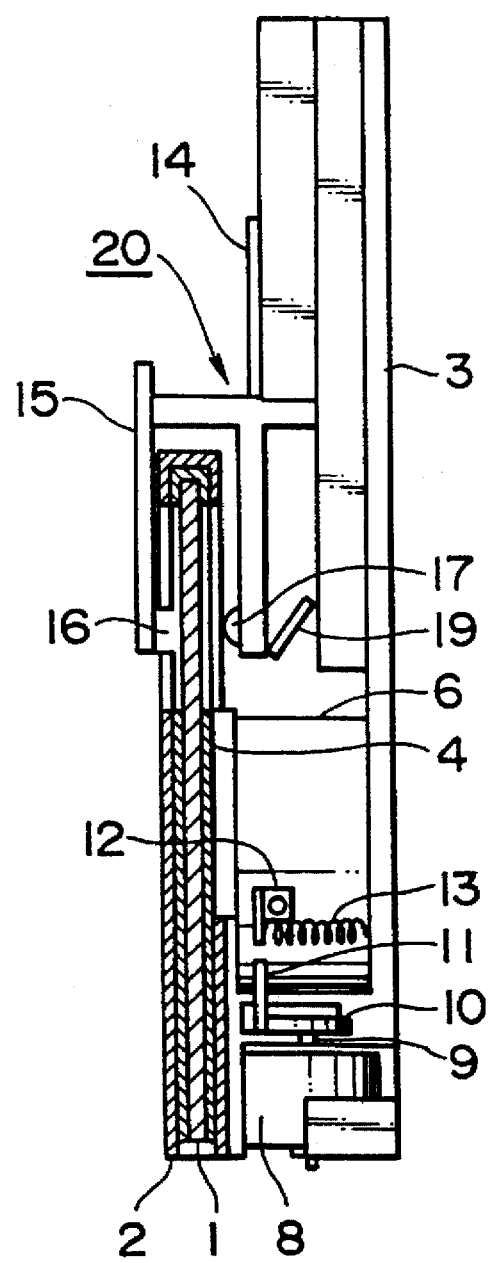
FIG. 5 is a side view of the disk drive device of FIG. 3.

A preferred embodiment of the present invention will now be described with reference to FIGS. 1 and 2, in which the parts corresponding to those shown in FIGS. 3, 4 and 5 are designated by the same reference numerals, and the explanation thereof will be hereinafter omitted. The preferred embodiment is characterized in that a block 21 as the positioning means is fixed on the chassis 3; a reference planar projection 21a for restricting an upper limit of a vertical stroke of the spindle motor 5 as the rotatively driving means is formed at the upper portion of the block 21; and two compression coil springs 22 as the biasing means for biasing the spindle motor 5 against the reference planar projection 21a of the block 21. The two compression coil springs 22 are wound around the outer circumferences of the two guide shafts 7, respectively, and are interposed under compression between the lower surface of the spindle motor 5 and the upper surface of the chassis 3. The pin 11 projecting from the casing 6 of the spindle motor 5 is in contact with the cam surface of the cam 10 as the vertically driving means, and the spindle motor 5 is lowered to a predetermined position by rotating the loading motor 8 to rotate the cam 10. When the upper surface of the spindle motor 5 is brought into pressure contact with the reference planar projection 21a of the block 21 by the biasing force of the compression coil springs 22, the cam surface of the cam 10 starts to separate from the pin 11 of the spindle motor 5 before reaching the rotational top end of the cam 10.

The operation of the above preferred embodiment will be described. In the condition where the cartridge 1 is not inserted in the cartridge holder 2, the cam 10 operates to downwardly urge the pin 11 and thereby maintain the spindle motor 5 at a predetermined lower level. This lower level is suitably set so that the cartridge 1 to be inserted may not interfere with the spindle motor 5, and a high accuracy of the cam surface of the cam 10 is not necessary.

When the cartridge 1 is inserted into the cartridge holder 2 until a predetermined position, a sensor (not shown) is turned on to start rotation of the loading motor 8. Accordingly, the cam 10 contacting the pin 11 is rotated to permit the lifting of the spindle motor 5 by the biasing force of the compression coil springs 22 until the upper surface of the spindle motor 5 comes into contact with the reference planar projection 21a of the block 21. Then, the cam 10 is further rotated so that the cam surface thereof comes away from the pin 11. In this condition, the spindle motor 5 is maintained in a predetermined upper position with a high accuracy.

According to this preferred embodiment, the spindle motor 5 in the loaded condition of the cartridge 1 is urged against the reference planar projection 21a of the block 20, so that the spindle motor 5 can be held stably in the predetermined upper position. Accordingly, the spacing between the disk 4 loaded and the head 16 of the actuator section 20 can be maintained at an accurately constant value. Furthermore, the projections 12 for supporting the tensile coil springs 13 necessary in the prior art can be eliminated, and the accuracy of the cam surface of the cam 10 need not be so high.

Although the above preferred embodiment is applied to an optical disk player as an example of a recording/reproducing apparatus, it is understood that a similar effect can be obtained also in the case where the disk drive device of the present invention is applied to any other recording/reproducing apparatus employing the disk.

What is claimed is:

1. A disk drive device comprising:

a chassis;

rotatively driving means vertically movably mounted on said chassis, for rotatively driving a disk-shaped recording medium;

vertically driving means contacting a part of said rotatively driving means, for vertically driving said rotatively driving means;

a loading motor mounted on said chassis, for rotatively driving said vertically driving means;

positioning means fixed to said chassis, for restricting an upper limit of a vertical stroke of said rotatively driving means; and biasing means for biasing said rotatively driving means against said positioning means.

2. A disk drive device comprising:

a chassis;

a spindle motor vertically movably mounted on said chassis, for rotatively driving a disk-shaped recording medium:

a cam contacting a pin projecting from said spindle motor, for vertically driving said spindle motor through said pin;

a loading motor mounted on said chassis, for rotatively driving said cam;

a block fixed to said chassis, for restricting an upper limit of a vertical stroke of said spindle motor; and a spring for biasing said spindle motor against said block wherein an end of said block forms a reference planar projection which contacts a surface of said spindle motor, said spring comprises a compression coil spring interposed between said chassis and said spindle motor, for biasing said surface of said spindle motor against said reference planar projection formed by said end of said block, and said cam is separate from said pin of said spindle motor in a condition where said surface of said spindle motor is in contact with said reference planar projection formed by said end of said block.

* * * * *